(12) United States Patent
Dodge et al.

(10) Patent No.: US 8,475,578 B2
(45) Date of Patent: *Jul. 2, 2013

(54) MAGENTA INKS AND INK SETS FOR INK-JET IMAGING

(75) Inventors: Tye J. Dodge, Albany, OR (US); Murray Macleod, Dublin (IE); Marlene Ann McGorrin, Corvallis, OR (US); Larrie Deardurff, Corvallis, OR (US); Linda C. Uhlir-Tsang, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 392 days.

This patent is subject to a terminal disclaimer.

(21) Appl. No.: 12/739,401

(22) PCT Filed: Oct. 24, 2007

(86) PCT No.: PCT/US2007/022588
§ 371 (c)(1),
(2), (4) Date: Apr. 22, 2010

(87) PCT Pub. No.: WO2009/054829
PCT Pub. Date: Apr. 30, 2009

(65) Prior Publication Data
US 2010/0251933 A1  Oct. 7, 2010

(51) Int. Cl.
*C09D 11/02* (2006.01)

(52) U.S. Cl.
USPC ............ 106/31.48; 106/31.43; 106/31.47; 106/31.49; 106/31.5; 106/31.51; 106/31.59

(58) Field of Classification Search
USPC ............ 106/31.48, 31.43, 31.47, 31.49, 31.5, 106/31.51, 31.59
See application file for complete search history.

(56) References Cited

U.S. PATENT DOCUMENTS

| | | | |
|---|---|---|---|
| 4,939,118 A | 7/1990 | Etzbach et al. | |
| 5,141,556 A | 8/1992 | Matrick | |
| 5,180,425 A | 1/1993 | Matrick et al. | |
| 5,224,987 A | 7/1993 | Matrick | |
| 5,356,464 A | 10/1994 | Hickman et al. | |
| 5,383,960 A | 1/1995 | Gregory et al. | |
| 5,389,132 A | 2/1995 | Davulcu et al. | |
| 5,401,303 A | 3/1995 | Stoffel et al. | |
| 5,667,569 A | 9/1997 | Fujioka | |
| 5,833,743 A | 11/1998 | Elwakil | |
| 6,120,589 A | 9/2000 | Bannai et al. | |
| 6,506,806 B2 | 1/2003 | Taylor et al. | |
| 6,523,947 B2 | 2/2003 | Koga et al. | |
| 6,582,502 B2 | 6/2003 | Fujiwara | |
| 6,641,257 B1 | 11/2003 | Shi et al. | |
| 6,676,735 B2 | 1/2004 | Oki et al. | |
| 6,695,443 B2 | 2/2004 | Arita et al. | |
| 6,808,555 B2 * | 10/2004 | Wang et al. | 106/31.43 |
| 6,835,240 B2 | 12/2004 | Nishita et al. | |
| 6,991,676 B2 * | 1/2006 | Kabalnov et al. | 106/31.48 |
| 7,264,662 B2 * | 9/2007 | Dodge et al. | 106/31.48 |
| 7,476,270 B2 * | 1/2009 | McGorrin | 106/31.47 |
| 7,479,178 B2 * | 1/2009 | Dodge et al. | 106/31.48 |
| 7,632,344 B2 * | 12/2009 | McGorrin | 106/31.49 |
| 7,811,369 B2 * | 10/2010 | Deardurff | 106/31.49 |
| 8,007,548 B2 * | 8/2011 | McGorrin | 8/552 |
| 2005/0109236 A1 | 5/2005 | Yabuki et al. | |
| 2006/0268086 A1 | 11/2006 | Kawakami et al. | |
| 2007/0188573 A1 | 8/2007 | Hamajima et al. | |
| 2010/0231663 A1 * | 9/2010 | Takasaki | 106/31.48 |

FOREIGN PATENT DOCUMENTS

| | | |
|---|---|---|
| JP | 2004051750 | 2/2004 |
| JP | 2007224119 | 9/2007 |
| WO | 02083795 | 10/2002 |
| WO | 03062324 | 7/2003 |
| WO | WO2005/040292 | 5/2005 |
| WO | 2006006703 | 1/2006 |
| WO | WO2007/083841 | 7/2007 |

OTHER PUBLICATIONS

Supplementary European Search Report dated Nov. 2, 2011, Applicant Hewlett-Packard Development Company, L.P., Reference 200704448-7, Application No./Patent No. 07861501.0-2103/2209861.

* cited by examiner

*Primary Examiner* — Helene Klemanski

(57) ABSTRACT

The present invention is directed to magenta inks and ink sets for ink-jet printing. The inks and ink sets provide exceptional ozone fastness, particularly when printed on porous media or plain paper. The inks of the ink sets are formulated to be compatible with each other and are capable of producing high quality printed images.

42 Claims, No Drawings

MAGENTA INKS AND INK SETS FOR INK-JET IMAGING

BACKGROUND OF THE INVENTION

The use of digital image-forming apparatuses such as, for example, thermal ink-jet printers, large-format plotters, piezo-electric printers, laser printers, silver halide grade photo imaging apparatuses, and others has grown in recent years. The growth may be attributed to substantial improvements in print resolution and overall print quality coupled with appreciable reduction in cost, and ease of use. Today's image-forming apparatuses offer acceptable print quality for many commercial, business, and household applications at costs lower than that offered in the past.

Perceived color quality can be quantified using any one of several color space systems, such as CIELAB or Munsell, as is well known in the art. With respect to Munsell color space, a given color is defined using three terms, namely Hue, Value, and Chroma. With respect to CIELAB color space, a color is defined using three terms L*, a*, and b*. With this system, L* defines the lightness of a color, and it ranges from 0 to 100 (with 100 being white). Additionally, the terms a* and b*, together, define the hue, where a* ranges from a negative number (green) to a positive number (red), and b* ranges from a negative number (blue) to a positive number (yellow). Additional terms such as h° (hue angle) and C* (chroma) are used to further describe a given color, as is known to those skilled in the art.

In general, a successful ink for color ink-jet printing has the following properties: good crusting resistance, good stability, appropriate viscosity and surface tension, rapid dry time, and/or consumer-safety. When placed into a thermal ink-jet system, the ink set should also be kogation-resistant. However, a single ink-jet ink which has good chroma, gamut, hue angle, and environmental robustness (e.g., air fastness, light fastness, water fastness) is not always optimal for use with other inks with which it is used in combination. In other words, not only does an individual ink (e.g., cyan, magenta, or yellow ink), have to independently have acceptable color qualities, but it should also work well when used as part of an ink set.

Accordingly, it would be desirable to provide inks for use in ink-jet printing, which when used individually as well as in combination with other inks, have acceptable print quality, reliability performance, and/or environmental robustness.

DETAILED DESCRIPTION OF THE PREFERRED EMBODIMENT(S)

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In describing and claiming the present invention, the following terminology will be used in accordance with the definitions set forth below.

It is noted that, as used herein, the singular forms of "a," "an," and "the" include plural referents unless the context clearly dictates otherwise. Thus, for example, reference to "an ink" includes one or more of such inks, reference to "an amount of dyes" includes reference to one or more amounts of dyes, and reference to "the ink set" includes reference to one or more ink sets.

As used herein, "vehicle," "liquid vehicle" or "ink vehicle" refers to the liquid fluid in which colorant is placed to form an ink Liquid vehicles are well known in the art, and a wide variety of liquid vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as latexes, polymers, UV curable materials, and/or plasticizers, in some embodiments.

As used herein, "ink" refers to a single liquid vehicle that contains at least a dye or a pigment, and in accordance with embodiments of the present invention, some inks can include at least two colorants (e.g., two dyes, two pigments, or a dye and a pigment).

As used herein, the term "set" refers to a set of inks, whether packaged or made available as part of a set, or packaged and made available separately for use with other members of the set.

As used herein, the term "fastness" refers to that property of the printed image which helps maintain its color characteristics (e.g., Hue, Value, Chroma) which may include light fastness, ozone fastness, water fastness, or a combination thereof.

As used herein the term "fade" refers to fading of the colored image due to environmental conditions such as ozone, light, other atmospheric pollutants, or combinations thereof.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

The present invention is directed to inks and ink sets used for ink-jet printing (e.g. piezoelectric or thermal ink-jet printing). In one embodiment, the dye set and the ink set of the present invention are formulated for use in thermal ink-jet printing systems such as the DESKJET®, DESIGNJET®, PHOTOSMART®, or other similar family of printers, which are commercially available from the Hewlett-Packard Company of Delaware. The inks and ink sets of the present invention are particularly useful for imaging and photo printers, including home and commercial printers. The inks of the present invention are useful for printing on inorganic porous particulate coated media (e.g., silica and/or alumina coated media), polymeric swellable media (e.g., hydrophilic polymer or gelatin coated media), or paper substrates, such as plain paper and uncoated paper. Exemplary print media that can be used includes, but is not limited to, Hewlett-Packard Advanced Glossy Photo Paper, Ilford Galerie Pearl Photo Ink-jet Paper (semi-gloss), Epson Premium Glossy Photo Paper, Pictorico Photo Gallery glossy paper, and one or more of a variety of plain papers.

In one embodiment, a magenta ink for use in ink-jet printing can include a first magenta dye and a second magenta dye. The first magenta dye can have the structure of Formula 1:

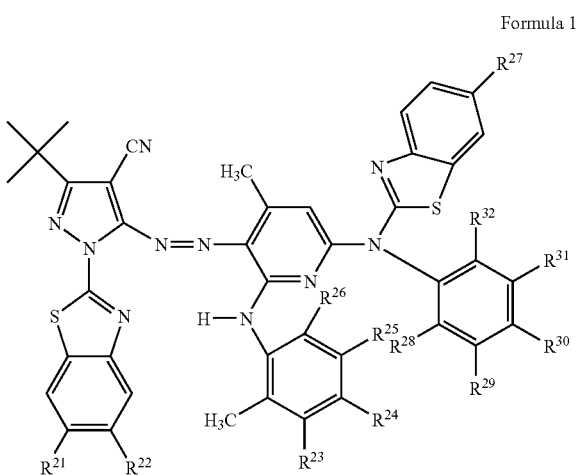

Formula 1

In Formula 1, $R^{21}$, $R^{23}$, $R^{25}$, $R^{27}$, $R^{29}$, and $R^{31}$; are independently a hydrogen atom or a sulfonate group, $R^{22}$ is a hydrogen atom or a nitro group, $R^{26}$ and $R^{28}$ are independently a hydrogen atom or a methyl group, $R^{24}$ and $R^{30}$ are independently a methyl or sulfonate group, and $R^{32}$ is a methyl or a methoxy group.

In one embodiment, in Formula 1, $R^{21}$, $R^{23}$, $R^{27}$, and $R^{31}$ can be sulfonate groups; $R^{22}$, $R^{25}$, and $R^{29}$ can be hydrogen atoms; and $R^{24}$, $R^{26}$, $R^{28}$, $R^{30}$, and $R^{32}$ can be methyl groups. In another embodiment, the sulfonate group can be a salt of lithium, sodium, potassium, ammonium, tetramethylammonium, or a mixture thereof. In still another embodiment, the sulfonate group can be a salt of potassium.

The second magenta dye can have the structure of Formula 2A:

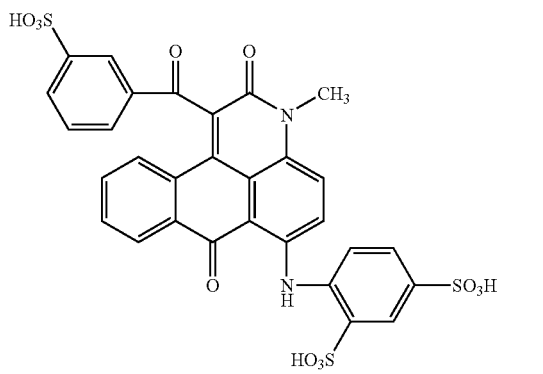 [SMILES: Cn1c(=O)c(C(=O)c2cccc(S(=O)(=O)O)c2)c2c3c(c(Nc4ccc(S(=O)(=O)O)cc4S(=O)(=O)O)ccc31)C(=O)c1ccccc1-2]

Formula 2A

Formula 2A above is shown in acid form, but it is noted that this can also be used in salt form, such as, but not limited to, potassium, sodium, lithium, and ammonium salts.

In addition to these two types of dyes, other magenta and non-magenta dyes can also be present in the magenta ink-jet ink.

Alternatively, in another embodiment, an ink-jet ink can comprise the dye of Formula 1 and a second magenta dye which is very bright, e.g., dyes having a chroma value of at least 60 when printed on plain paper at a 5 wt % dye load, e.g., vehicle of water. This is not to mean that this is necessarily the dye load in the finished ink-jet ink, but rather, this dye load can be used to test the chroma of the dye to determine whether it meets the criteria of having a chroma value of at least 60 when printed on plain paper. Appropriate dyes that may qualify include certain azo dyes such as Pro-jet Magenta 432 liquid, or triazine-containing azo dyes such as Pro-jet Magenta 3B-OA liquid. Other suitable magenta blending dye structures that can be used include the following shown in Formulas 2B to 2F, as follows:

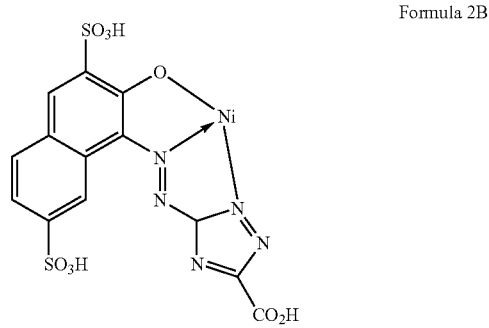

Formula 2B

-continued

Formula 2C

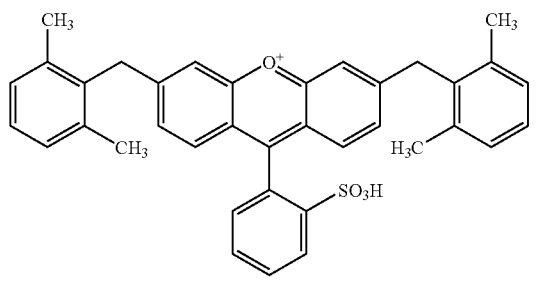

Formula 2D

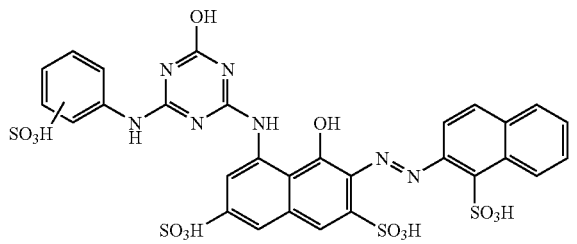

Formula 2E

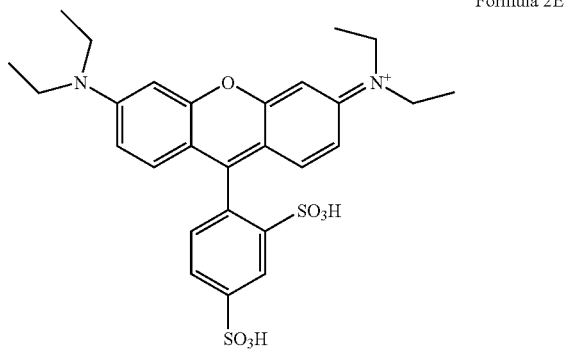

Formula 2F

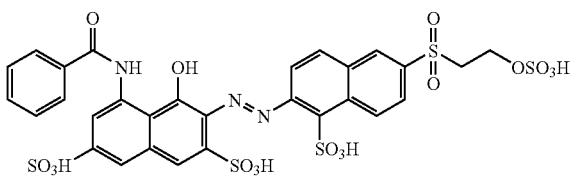

It is noted that each of the structures shown in Formulas 2B to 2F are depicted in acid form. However, it is understood that salt forms of these dyes are also included in these structures, e.g., potassium, sodium, lithium, and ammonium salts.

In an alternative embodiment, an ink set for ink-jet imaging can comprise a magenta ink including a dye as shown in Formula 1, a yellow ink, a black pigment containing black ink, and a cyan ink At least one of the cyan, magenta, or yellow inks (colored inks) in this embodiment includes at least one salt, which, when the colored ink contacts the black ink, causes the black pigment or a dispersing agent associated with the black pigment to precipitate, thereby helping to alleviate black to color bleed. In one embodiment, the black pigment can be a self-dispersed black pigment which includes dispersing agent attached to the surface of the black pigment (e.g. small molecule, polymeric, etc.), and in another embodiment, the black pigment can be dispersed by a separate dispersing agent that is not attached to the black pigment per se.

It is noted that though a black pigment is described as being part of certain ink sets in accordance with embodiments of the present invention, it is also noted that alternatively or additionally, a black dye can also be used in black inks described herein. Thus, the cyan, magenta, and yellow ink sets described herein can include a black ink as well, e.g., including dye and/or pigment.

The cyan ink that can be used includes a dye with the structure of Formula 3:

Formula 3 where M represents a hydrogen atom or a metal atom (or an oxide, hydroxide, or halide thereof), and $P_c$ represents a phthalocyanine nucleus. $R^1$ and $R^2$ each independently represent a substituent selected from the group of —$SOX^1$, —$SO_2X^1$, $SO_2NX^2X^3$, —$SO_3X^4$, where $X^1$, $X^2$, $X^3$, and $X^4$ each independently represents a hydrogen atom, a substituted or unsubstituted alkyl group, a substituted or unsubstituted aryl group, or a substituted or unsubstituted heterocyclic group. At least one of $R^1$ or $R^2$ has an ionic hydrophilic group as a substituent. Additionally, k and l each independently represents an integer ranging from 1 to 3. Typically, k and l are each independently selected such that k+l equals 4. In one example, k can be 2 to 3. Additionally, $R^1$ can be —SO—$(CH_2)_3$—$SO_3Z$ or —$SO_2$—$(CH2)_3$-$SO_3Z$; and/or $R^2$ can be —$SO_2$—$(CH_2)_3$—$SO_2NH$—$C_2H_4OC_2H_4OH$ or —$SO_2$—$(CH_2)_3$—$SO_2NH$—$CH_2CH(OH)CH_3$ In these embodiments, Z can be lithium, sodium, potassium, ammonium, tetramethylammonium, or a mixture thereof. In yet another embodiment, Z can be lithium or potassium. In a further embodiment, Z can be lithium. In one specific embodiment, $R^1$ can be —$SO_2$—$(CH2)_3$—$SO_3Z$, $R^2$ can be —$SO_2$—$(CH_2)_3$—$SO_2NH$—$CH_2CH(OH)CH_3$, k can be 3, and Z can be lithium. In one example, $R^1$ and $R^2$ can be independently a substituent selected from the group of —$SOX^1$, —$SO_2X^1$, $SO_2NX^2X^3$, —$SO_3X^4$; where $X^1$, $X^2$, $X^3$, and $X^4$ are independently a hydrogen atom, a substituted or unsubstituted $C_1$ to $C_7$ alkyl group, a substituted or unsubstituted aryl group, or a substituted or unsubstituted heterocyclic group; wherein at least one of $R^1$ or $R^2$ has an ionic hydrophilic group as a substituent.

The cyan ink can also include additional dyes or colorants. In one embodiment, the cyan ink further includes at least one additional dye, such as Direct Blue 199 (DB199), Direct Blue 86 (DB86), Direct Blue 87 (DB87), Direct Blue 307 (DB307), Acid Blue 7(AB7), or Acid Blue 9 (AB9). In another embodiment, the cyan ink includes AB9, or the sodium or lithium salt of AB9. In another embodiment, the AB9 is added to the cyan ink in an amount of from about 0.01 to about 1 wt %, from about 0.05 to about 0.5 wt %, or from about 0.07 to about 0.4 wt %.

Table I below, provides exemplary phthalocyanine dyes in accordance with embodiments of the present invention, where the substituents $R^1$ and $R^2$ is each introduced at the β-position. However, it should be appreciated by those skilled in the art, that although the preferred dye has the R substituent at the β-position, the dye and the ink containing the same can further include the same basic nucleus with the R substituent at different positions such as the α-position. In the exemplary dyes shown in Table I, M is copper (Cu).

TABLE I

| Cyan Dye | $R_1$ | k | R2 | l |
|---|---|---|---|---|
| C1 | —SO—$(CH_2)_3$—$SO_3K$ | 3 | —$SO_2$—$(CH_2)_3$—$SO_2NH$—$C_2H_4OC_2H_4OH$ | 1 |
| C2 | —$SO_2$—$(CH2)_3$—$SO_3K$ | 2 | —$SO_2$—$(CH_2)_3$—$SO_2NH$—$C_2H_4OC_2H_4OH$ | 2 |
| C3 | —$SO_2$—$(CH_2)_3$—$SO_3Li$ | 3 | —$SO_2$—$(CH_2)_3$—$SO_2NH$—$CH_2CH(OH)CH_3$ | 1 |
| C4 | —$SO_2$—$(CH_2)_3$—$SO_3Li$ | 2.7 | —$SO_2$—$(CH_2)_3$—$SO_2NH$—$CH_2CH(OH)CH_3$ | 1.3 |
| C5 | —$SO_2$—$(CH_2)_3$—$SO_3Li$ | 2 | —$SO_2$—$(CH_2)_3$—$SO_2NH$—$CH_2CH(OH)CH_3$ | 2 |

A variety of salts can be used in the above embodiment in order to cause the pigment in the black ink to precipitate when the pigment contacts the salt on a media substrate. The precipitation can occur when the self-dispersing pigment in the black ink interacts with multi-valent (inorganic or organic) salts present in at least one of the colored (e.g. cyan, magenta, yellow) inks. The multi-valent salts are typically soluble in the ink in the concentration employed. Suitably-employable cations for the multivalent salt include alkaline earth metals of Group 2A of the Periodic Table (e.g. magnesium and calcium); the transition metals of Group 3B of the Periodic Table (e.g. lanthanum); cations from Group 3A of the Periodic Table (e.g. aluminum); and lanthanides (e.g. neodymium). Preferably, calcium and magnesium are employed as the cations. Suitably employed anions associated with the calcium or magnesium can include, but are not limited to, nitrate, chloride, acetate, perchlorate, formate, sulfate, or thiocyanate. In one embodiment, calcium nitrate, calcium chloride, calcium acetate, magnesium nitrate, magnesium chloride, magnesium acetate, or a combination thereof can be used. If used, the salt could be present in an amount of from about 1.0 wt % to about 10 wt %, from 1.5 wt % to about 7 wt %, or from 2 wt % to about 6 wt %. In one example, the ink can further include calcium cations, magnesium cations, or a combination of calcium and magnesium cations at from about 1,000 ppm to 20,000 ppm.

Pigments and self-dispersed pigments are generally known in the art. Self-dispersed pigment particles are surface-treated or chemically modified with functional groups so as to render the pigment particles dispersible in the liquid vehicle. Examples of water-dispersible black pigments suitable for use herein are made from commercially available pigments obtained from colorant vendors such as Cabot Corp. Although many base black pigments can be used in the above described ink set, the following pigments comprise only a partial list of pigments which can be used, whether self-dispersed or in a more standard configuration where the surface is not attached to a dispersing agent per se. Base Cabot pigments include Monarch 1400, Monarch 1300, Monarch 1100, Monarch 1000, Monarch 900, Monarch 880, and Monarch 700, Cab-O-Jet 200 and Cab-O-Jet 300. Useful pigments available from Columbian include Raven 7000, Raven 5750, Raven 5250, Raven 5000, and Raven 3500. Pigments available from Degussa include Color Black FW 200, Color Black FW 2V, Color Black FW1, Color Black FW 18, Color Black FW S160, Color Black FW S170, Special Black 6, Special Black 5, Special Black 4A, Special Black 4, Printex U, Printex 140U, Printex V, and Printex 140V. In the above list, Cab-O-Jet 200 and Cab-O-Jet 300 are some examples of self-dispersed pigments with surface ionic groups attached. All of the above pigments can use different chemical modifiers. With this in mind, whether using a self-dispersed or in a more standard pigment configuration (without the dispersing agent attached to the surface), in embodiments where a salt is present in one of the other inks of an ink set, when the black pigmented ink contacts the salt, a precipitation reaction can occur, thereby alleviating bleed between black and other colors of the ink set.

In an alternative embodiment, yet another ink set is provided which includes a magenta ink having at least a first magenta dye having the structure of Formula 1 and a second magenta dye having the structure of Formula 2, a cyan ink with at least one cyan dye having the structure of Formula 3, and a yellow ink.

In each of the above described ink set embodiments, at least one ink is formulated to work in cooperation with the at least one other ink of the ink set to enhance the properties of the printed image. In one embodiment, the enhanced image properties include enhancement of "fastness" of the printed image; in particular, enhancement of ozone fastness, light fastness, and/or water fastness.

In the ink set embodiments set forth above, the yellow ink may contain any yellow dye or combination of dyes known in the art. In one embodiment, the yellow ink in the above described ink sets includes least one azo yellow dye. In another embodiment, the yellow ink includes a yellow dye having the structure of Formula 4:

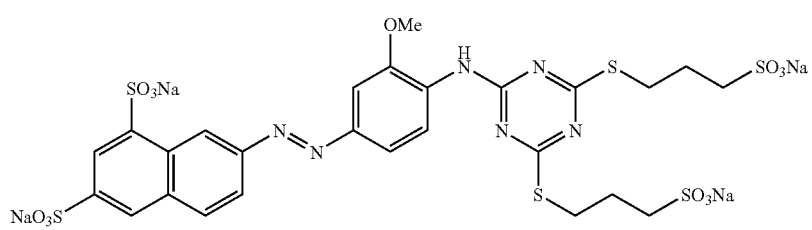

Formula 4

In another embodiment, at least one of the inks in the above described ink and ink set embodiments may further include an anti-flocculent material, such as a phenylenediamine compound derivative having the structure of Formula 5:

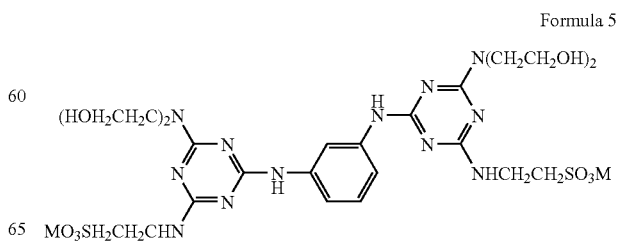

Formula 5

In Formula 5 above, this compound can be a salt where M is a monovalent ion, such as, but not limited to, ammonium, potassium, lithium, or sodium.

The presence of the phenylenediamine compound derivative can act as an anti-flocculent, reducing unwanted aggregation of the dyes in the ink(s). In one embodiment, the diphenylamine additive improves the quality of the printed images, in particular on swellable media, by reducing coalescence and bronzing of the ink on the printing medium. In one embodiment, when present, the phenylenediamine compound derivative may be added to one or more of each ink in an amount generally ranging from about 0.2 to about 14%, from about 0.5 to about 14%, from about 1 wt % to about 13%, from about 1.5 to about 12 wt %, or from about 3 to about 12%, based on the total weight of the ink. In another embodiment, the phenylenediamine compound is present at least in the cyan ink.

The dyes or other colorants in the inks of the present invention may be present in amounts of from about 0.05 wt % to about 10 wt %, from about 0.5 wt % to about 8 wt %, from about 2 wt % to about 8 wt %, or from about 1 wt % to about 6 wt %, based on the total weight of the ink. It is noted that the amounts of dye(s) present in each of the inks is independent for each dye and for each ink (e.g. the magenta dye might contain 3.5 wt % of Formula 1 and 2 wt % of Formula 2A-2F, or the cyan ink might have 4 wt % Formula 3).

The vehicle for the inks of the present invention can comprise an aqueous-based vehicle that includes water or a mixture of water and at least one water-soluble organic solvent. Selection of a suitable mixture depends on requirements of the specific application, such as desired surface tension and viscosity, the selected colorant, drying time of the liquid, and the type of substrate onto which the liquid will be printed.

A typical ink vehicle formulation usable in formulating the inks of the present invention may include one or more solvent or co-solvents, which may be added to each ink, in total, in an amount generally ranging from about 1 to about 50 wt %; from about 2 to about 45 wt %, or from about 5 to about 35 wt %. Classes of solvents or co-solvents that may be used include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, 1,6-alcohols, ethylene glycol alkyl ethers, propylene glycol alkyl ethers, higher homologs (the alkyl having at least six carbons) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, tetraethylene glycol; 2-pyrrolidinone; 1,5-pentanediol; 2-ethyl-2-(hydroxymethyl)-1,3-propanediol, and 1-(2-hydroxyethyl)-2-pyrrolidinone.

One or more surfactants may also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, as well as fluorocarbon surfactants such as those formed at least in part from a polymer prepared based on oxetane chemistry having the Formula 6 below

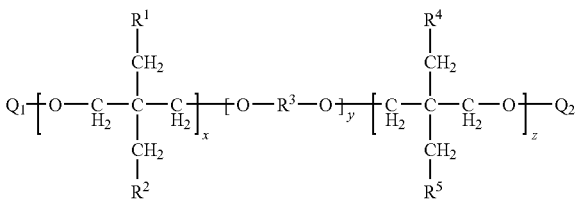

Formula 6

In Formula 6, $Q_1$ and $Q_2$ are independently selected from the group of H, $SO_3^-W^+$, $COO^-W^+$, and COOH, where W is $NH_4$, Li, Na, and K; $R^1$ and $R^2$, are independently selected from the group of H and OH; $R^4$ and $R^5$ are independently selected from the group of $O(CH_2)_m$—$(CF_2)_n$—$CF_3$ where m is from 1 to 3 and n is from 0 to 3; and $R^3$ is selected from the group of $(CH_2)_L$, and

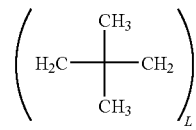

where L is from 1 to 4, x is from 1 to 10, y is from 1 to 30, and z is from 1 to 10. In one embodiment, the oxetane-based fluorocarbon surfactant is formed from at least one polymeric material where L is 4, m is 1, n is 1 and $R^2$ and $R^4$ are H.

Examples of suitable oxetane-based fluorocarbon surfactants include, but are not limited to those generally available from companies such as Omnova Solutions, Inc. of Fairlawn, Ohio under the trade name of PolyFox® fluorocarbon surfactants. Exemplary PolyFox® surfactants include PolyFox PF-136A, PolyFox PF-151N, PolyFox PF-154N, PolyFox PF-156A, and PolyFox PF-159.

The fluorinated surfactant of Formula 6, when present, may generally be added to the ink in an amount ranging, from about 0.0005 to about 5.0 wt %, from about 0.0005 to about 2 wt %, from about 0.01 wt. % to about 5.0 wt. %, from about 0.05 to about 1.0 wt %, from about 0.1 to about 1.0 wt %, from about 0.2 wt % to about 0.6 wt %, of the total weight of the ink-jet ink (with the wt % numbers for the fluorinated surfactant corrected for the % solids).

In one embodiment, when present, one or more non-fluorinated surfactant(s) may generally be added, independently, to each ink in an amount ranging from about 0.01 to about 5.0 wt. %, from about 0.1 to about 3.0 wt %, from about 0.2 to about 2.0 wt %; 0.2 to about 1.0 wt %; based on the total weight of the ink; with a total amount, independently for each ink, ranging from about 0.1 to about 10 wt %, from about 0.2 to about 6.0 wt %, from about 0.4 to about 4.0 wt %, from about 0.4 to about 2 wt %. Examples of nonionic and amphoteric surfactants include Tergitol compounds, which are alkyl polyethylene oxides available from Dow Chemical (Midland, Mich.); Triton compounds, which are alkyl phenyl polyethylene oxide surfactants available from Rohm & Haas Co. (Philadelphia, Pa.); Brij compounds available from ICI Americas (Wilmington, Del.); Pluronic compounds, which are polyethylene oxide/polypropylene oxide block copolymers; Surfynol compounds, which are acetylenic polyethylene oxides available from Air Products (Allentown, Pa.); anionic surfactants such as members of the Dowfax family of diphenyl sulfonate derivatives available from the Dow Chemical Company, and the Crodafos family of phosphate esters available from Croda Incorporated; polyethylene oxide ("POE") esters; POE diesters; POE amines; POE amides; and dimethicone copolyols.

Consistent with the invention, various types of additives may be employed in the inks to optimize the properties of the ink compositions for specific applications. The remainder of the ink compositions may be mostly water; however, other independently selected components including surfactants, humectants, anti-kogation additives, anti-corrosive additives, polymers, preservatives, biocides that inhibit growth of microorganisms (such as the preservative PROXEL™ GXL available from Avecia Incorporated); chelating agents (or sequestering agents) such as EDTA that eliminate deleterious effects of heavy metal impurities; buffers to maintain the ink at a desired pH (such as Trizma base, available from Sigma-Aldrich Corp. (Milwaukee, Wis.); 4-morpholine ethane sulfonic acid ("MES"); 4-morpholinepropanesulfonic acid ("MOPS"); and beta-hydroxy-4-morpholinepropane-sulfonic acid ("MOPSO"); and viscosity modifiers, may be added to improve various properties of the ink composition.

In addition to the properties set forth above, the inks and ink sets of the present invention provide excellent porous media printing, as well as excellent print quality on plain paper, and work well over a broad range of pH values, including pH 5.5 to pH 8.5, for example.

EXAMPLES

The following examples illustrate various aspects of the inks and ink sets in accordance with embodiments of the present invention. The following examples should not be considered as limitations of the invention, but should merely teach how to make the best inks, reflecting the present invention.

Example 1

Cyan, Magenta, Yellow Ink Set

An ink-jet ink set is prepared according to Table 2, as follows:

TABLE 2

| Ingredient | Cyan | Magenta | Yellow |
|---|---|---|---|
| | | Wt % | |
| 1-(2-hydroxyethyl)-2-pyrrolidinone | 2.0-6.0% | — | — |
| 2-pyrrolidinone | — | 0-5.0% | 0.2-6.0% |
| 1,5-pentanediol | 2.0-7.0% | 2.0-8.0% | 2.0-15.0% |
| Trimethyolpropane | 5.0-9.8% | 0-5.0% | — |
| 1,6-hexanediol | 0.5-4.0% | 5.0-15.0% | 2.0-15.0% |
| Imidazole or Trizma base | 0.1-2.0% | — | — |
| Surfactant | 0.1-3.0% | 0.1-3.0% | 0.1-3.0% |
| MOPS or MES | — | 0.05-1.0% | 0.05-1.0% |
| EDTA | 0.05-0.5% | 0.05-0.5% | 0.05-0.5% |
| Salt | 1.0-5.0% | 1.0-5.0% | 1.0-5.0% |
| Biocide | 0.01-0.3% | 0.01-0.3% | 0.01-0.3% |
| Cyan Dye of Formula 3 | 0.5-5.0% | — | — |
| Magenta Dye of Formula 1 | — | 0.5-8.0% | — |
| Yellow Dye of Formula 4 | — | — | 0.5-6.0% |
| Water | Balance | Balance | Balance |
| pH | 6.0-8.5 | 7.0-7.5 | 6.0-7.5 |

The ink set including the cyan, magenta, and yellow ink shown in Table 2 can be used to generate printed images with acceptable ozone resistance and water fastness even when printed on porous media.

Example 2

Cyan, Magenta, Yellow, and Black Ink Set

An ink set is prepared according to Example 1 and further includes a black ink with a self-dispersed black pigment having surface ionic groups. The ink set can be used to print images with acceptably low black to color bleed, as well as acceptable ozone and water fastness.

Example 3

Cyan, Magenta, Yellow Ink Set

An ink-jet ink set is prepared according to Table 3, as follows:

TABLE 3

| Ingredient | Cyan | Magenta | Yellow |
|---|---|---|---|
| | | Wt % | |
| 1-(2-hydroxyethyl)-2-pyrrolidinone | 2.0-6.0% | — | — |
| 2-pyrrolidinone | — | 0-5.0% | 0.2-6.0% |
| 1,5-pentanediol | 2.0-7.0% | 3.0-8.0% | 2.0-15.0% |
| Trimethyolpropane | 5.0-9.8% | 0-5.0% | — |
| 1,6-hexanediol | 0.5-4.0% | 5.0-15.0% | 0.5-4.0% |
| Imidazole or Trizma base | 0.1-2.0% | — | — |
| Surfactant | 0.1-3.0% | 0.1-3.0% | 0.1-3.0% |
| MOPS or MES | — | 0.05-1.0% | 0.05-1.0% |
| EDTA | 0.05-0.5% | 0.05-0.5% | 0.05-0.5% |
| Biocide | 0.01-0.3% | 0.01-0.3% | 0.01-0.3% |
| Cyan Dye of Formula 3 | 0.5-5.0% | — | — |
| AB9 | 0.05-1.0% | — | — |
| Magenta Dye of Formula 1 | — | 0.5-8.0% | — |
| *Magenta Dye of Formula 2A | — | 0.05-4% | — |
| Yellow Dye of Formula 4 | — | — | 0.5-6.0% |
| Water | Balance | Balance | Balance |
| pH | 6.0-8.5 | 7.0-7.5 | 6.0-7.5 |

*It is noted that blending magenta dyes having a chroma of at least 60 when printed at 5 wt % dye load on plain paper can be used instead of the dye of Formula 2A, e.g., dyes of Formula 2B to 2F.

The ink set including the cyan, magenta, and yellow ink shown in Table 3 can be used to generate printed images with acceptable ozone resistance and water fastness even when printed on porous media.

Example 4

Cyan, Magenta, Yellow Ink Set

An ink-jet ink set is prepared according to Table 4, as follows:

TABLE 4

| Ingredient | Cyan | Magenta | Yellow |
|---|---|---|---|
| | | Wt % | |
| 1-(2-hydroxyethyl)-2-pyrrolidinone | 2.0-6.0% | — | — |
| 2-pyrrolidinone | — | 0-5.0% | 0.2-6.0% |
| 1,5-pentanediol | 2.0-7.0% | 3.0-8.0% | 2.0-15.0% |
| Trimethyolpropane | 5.0-9.8% | 0-5.0% | — |
| 1,6-hexanediol | 0.5-4.0% | 5.0-15.0% | 0.5-4.0% |
| Imidazole or Trizma base | 0.1-2.0% | — | — |
| Surfactant | 0.1-3.0% | 0.1-3.0% | 0.1-3.0% |
| MOPS or MES | — | 0.05-1.0% | 0.05-1.0% |
| EDTA | 0.05-0.5% | 0.05-0.5% | 0.05-0.5% |
| Salt | 1.0-5.0% | 1.0-5.0% | 1.0-5.0% |

TABLE 4-continued

| Ingredient | Cyan | Magenta Wt % | Yellow |
|---|---|---|---|
| Biocide | 0.01-0.3% | 0.01-0.3% | 0.01-0.3% |
| Cyan Dye of Formula 3 | 0.5-5.0% | — | — |
| AB9 | 0.05-1.0% | — | — |
| Magenta Dye of Formula 1 | — | 0.5-8.0% | — |
| *Magenta Dye of Formula 2A | — | 0.05-4% | — |
| Yellow Dye of Formula 4 | — | — | 0.5-6.0% |
| Anti-flocculent of Formula 5 | 2-14% | 0-14% | 0-14% |
| Water | Balance | Balance | Balance |
| pH | 6.0-8.5 | 7.0-7.5 | 6.0-7.5 |

*It is noted that blending magenta dyes having a chroma of at least 60 when printed at 5 wt % dye load on plain paper can be used instead of the dye of Formula 2A, e.g., dyes of Formula 2B to 2F.

The ink set including the cyan, magenta, and yellow ink shown in Table 4 can be used to generate printed images with acceptable ozone resistance and water fastness even when printed on porous media.

Example 5

Cyan, Magenta, Yellow, and Black Ink Set

An ink set is prepared according to Example 4 and further includes a black ink with a self-dispersed black pigment having surface ionic groups. The ink set can be used to print images with acceptably low black to color bleed, as well as acceptable ozone and water fastness.

Example 6

Ozone Fastness and Light Fade for Ink-jet Inks and Ink Sets

Ink-jet inks prepared in accordance with the examples here were printed on print media and evaluated for ozone fastness. Ozone exposure testing was conducted at 25° C., 50% RH (relative humidity), and 1 ppm ozone, with 40 ppm*hrs being considered equivalent to one (1) year of real time exposure. Failure of each printed sample was defined as 30% OD loss. The ozone fade number for the tested inks was about 7 years.

Light fade exposures was also evaluated using the color balance change of three color ratios (C/M, C/Y, M/Y), where a ratio >0.15 or <−0.15 is regarded as an objectionable hue shift. In addition, looking at pure color where the change is greater than 20-35% based on color, this is also considered objectionable. The light fade exposures were conducted under glass at approximately 23-27° C., 50% RH, and 60-80 kLux with 1971 kLux*hrs being considered equivalent to one (1) year of real time exposure. All color measurements are performed with a D65 illuminant and a (two) 2 degree observer. The cyan, magenta, and yellow optical densities were measured with red, green, and blue filters, respectively. The light fade number for the tested inks was about 90 years, which is applicable to both of the above-described failure modes.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A magenta ink jet ink, comprising:
(a) a magenta dye having the structure:

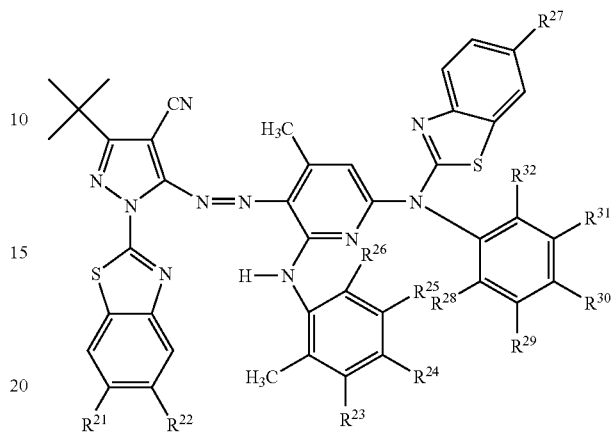

wherein
$R^{21}$, $R^{23}$, $R^{25}$, $R^{27}$ $R^{29}$, and $R^{31}$ are independently a hydrogen atom or sulfonate group;
$R^{22}$ is a hydrogen atom or nitro group;
$R^{26}$ and $R^{28}$ are independently a hydrogen atom or methyl group;
$R^{24}$ and $R^{30}$ are independently a methyl or sulfonate group; and
$R^{32}$ is a methyl or methoxy group; and
(b) a second magenta dye having the structure:

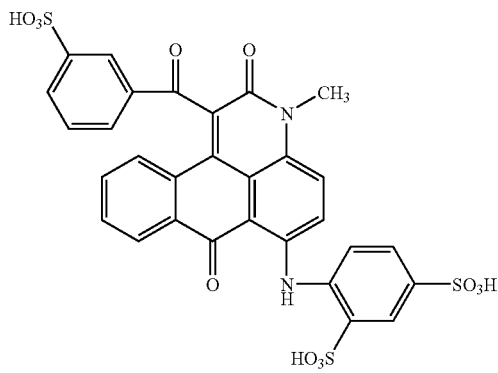 [SMILES: Cn1c(=O)c(C(=O)c2cccc(S(=O)(=O)O)c2)c2c3c(c(Nc4ccc(S(=O)(=O)O)cc4S(=O)(=O)O)ccc31)C(=O)c1ccccc1-2]

including potassium, sodium, lithium, and ammonium salts thereof;
wherein the ink further includes calcium cations, magnesium cations, or a combination of calcium and magnesium cations at from about 1,000 ppm to 20,000 ppm.

2. The magenta ink jet ink of claim 1, wherein the ink further includes a salt selected from the group consisting of calcium nitrate, calcium chloride, calcium acetate, magnesium nitrate, magnesium chloride, magnesium acetate, and combinations thereof.

3. The magenta ink-jet ink of claim 2, wherein the salt comprises $Mg(NO_3)_2$, or a hydrate thereof.

4. The magenta ink jet ink of claim 1, wherein the ink further comprises a fluorocarbon surfactant formed at least in part from a polymer having the structure:

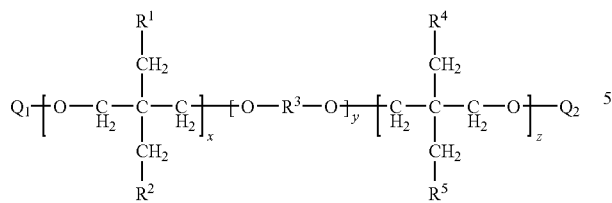

wherein
- $Q_1$ and $Q_2$ are independently selected from the group consisting of H, $SO_3^-W^+$, $COO^-W^+$, and COOH, where W is selected from the group consisting of $NH_4$, Li, Na, and K;
- $R_1$ and $R_2$ are independently selected from the group consisting of H and OH;
- $R_4$ and $R_5$ are independently selected from the group consisting of $O(CH_2)_m-(CF_2)_n-CF_3$, wherein m is from 1 to 3 and n is from 0 to 3;
- $R_3$ is selected from the group consisting of $(CH_2)_L$ and

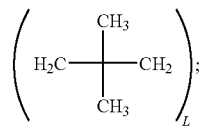

L is from 1 to 4;
x is from 1 to 10;
y is from 1 to 30; and
z is from 1 to 10.

5. The magenta ink jet ink of claim 4, wherein L is 4; m is 1; n is 1; and $R_1$ and $R_2$ are both H.

6. The magenta ink jet ink of claim 4, wherein the concentration of the fluorocarbon surfactant in the ink is from about 0.1 wt % to about 1 wt % based on the total weight of the ink.

7. An ink set for ink jet printing, comprising:
(a) a cyan ink including a cyan dye having the structure:

wherein
- M is a hydrogen atom; a metal atom; or an oxide, hydroxide, or halide of the metal atom;
- $P_c$ is a phthalocyanine nucleus;
- $R^1$ and $R^2$ are independently a substituent selected from the group consisting of $-SOX^1$, $-SO_2X^1$, $SO_2NX^2X^3$, $-SO_3X^4$; where $X^1$, $X^2$, $X^3$, and $X^4$ are independently a hydrogen atom, a substituted or unsubstituted $C_1$ to $C_7$ alkyl group, a substituted or unsubstituted aryl group, or a substituted or unsubstituted heterocyclic group; wherein at least one of $R^1$ or $R^2$ has an ionic hydrophilic group as a substituent; and
- k and l are independently an integer ranging from 1 to 3, where the sum of k and l is 4;

(b) a magenta ink, comprising:
(i) a magenta dye having the structure:

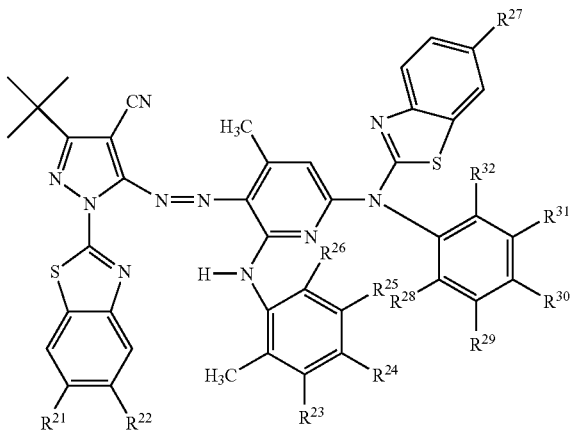

wherein
- $R^{21}$, $R^{23}$, $R^{25}$, $R^{27}$, $R^{29}$, and $R^{31}$ are independently a hydrogen atom or sulfonate group;
- $R^{22}$ is a hydrogen atom or nitro group;
- $R^{26}$ and $R^{28}$ are independently a hydrogen atom or methyl group;
- $R^{24}$ and $R^{30}$ are independently a methyl or sulfonate group; and
- $R^{32}$ is a methyl or methoxy group;

(ii) a second magenta dye having the structure:

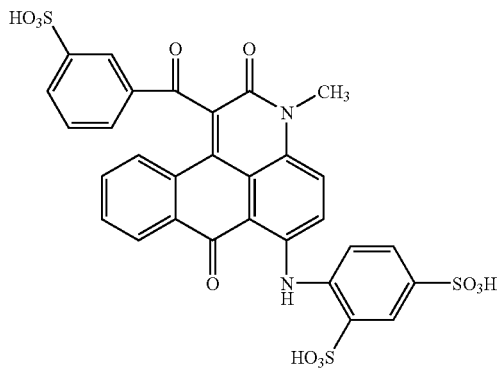

including potassium, sodium, lithium, and ammonium salts thereof; and
(c) a yellow ink;
wherein the magenta ink further includes calcium cations, magnesium cations, or a combination of calcium and magnesium cations at from about 1,000 ppm to 20,000 ppm.

8. The ink set of claim 7, wherein with respect to the cyan dye:
- $R^1$ is $-SO-(CH_2)_3-SO_3Z$, or $-SO_2-(CH_2)_3-SO_3Z$;
- $R^2$ is $-SO_2-(CH_2)_3-SO_2NH-C_2H_4OC_2H_4OH$, or $-SO_2-(CH_2)_3-SO_2NH-CH_2CH(OH)CH_3$,
- k is from 2 to 3; and
- Z is lithium, sodium, potassium, ammonium, tetramethylammonium, or a mixture thereof.

9. The ink set of claim 8, wherein with respect to the cyan dye:
$R^1$ is $-SO_2-(CH_2)_3-SO_3Z$;
$R^2$ is $-SO_2-(CH_2)_3-SO_2NH-CH_2CH(OH)CH_3$;
k is 3; and
Z is lithium.

10. The ink set of claim 7, wherein with respect to the magenta dye:
$R^{21}$, $R^{23}$, $R^{27}$, and $R^{31}$ are sulfonate groups;
$R^{22}$, $R^{25}$, and $R^{29}$ are hydrogen atoms; and
$R^{24}$, $R^{26}$, $R^{28}$, $R^{30}$, and $R^{32}$ are methyl groups.

11. The ink set of claim 7, wherein the yellow ink includes a yellow dye having the structure:

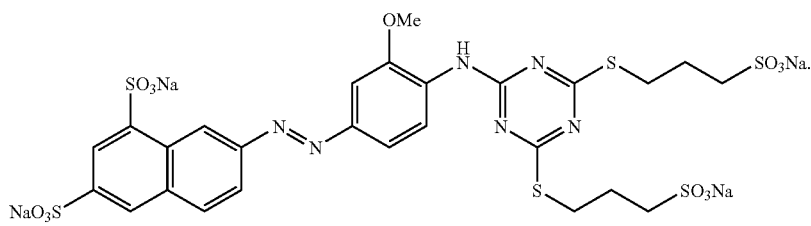

12. The ink set of claim 7, wherein the cyan ink further comprises AB9 or AB7.

13. The ink set of 7, wherein at least one ink of the ink set further comprises a phenylenediamine compound derivative having the structure:

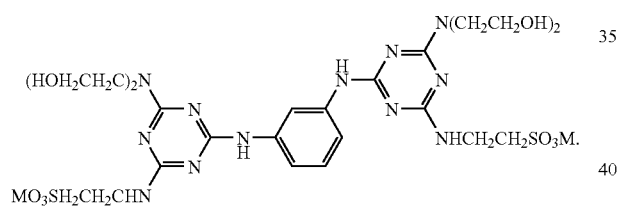

wherein M is a monovalent ion.

14. The ink set of claim 13, wherein the phenylenediamine compound derivative is present in the cyan ink.

15. The ink set of claim 13, wherein the phenylenediamine compound derivative concentration in the ink ranges from about 0.5 wt % to about 14 wt % based on the total weight of the ink.

16. The ink set of claim 7, wherein at least one ink in the ink set further comprises a fluorocarbon surfactant formed at least in part from a polymer with the structure:

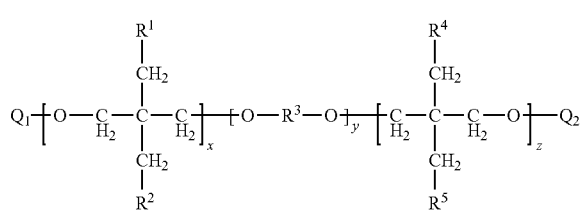

wherein
$Q_1$ and $Q_2$ are independently selected from the group consisting of H, $SO_3^-W^+$, $COO^-W^+$, and COOH, where W is selected from the group consisting of $NH_4$, Li, Na, and K;

$R_1$ and $R_2$ are independently selected from the group consisting of H and OH;

$R_4$ and $R_5$ are independently selected from the group consisting of $O(CH_2)_m-(CF_2)_n-CF_3$, wherein m is from 1 to 3 and n is from 0 to 3;

$R_3$ is selected from the group consisting of $(CH_2)_L$ and $$\left( H_2C - \underset{\underset{CH_3}{|}}{\overset{\overset{CH_3}{|}}{C}} - CH_2 \right)_L;$$

L is from 1 to 4;
x is from 1 to 10;
y is from 1 to 30; and
z is from 1 to 10.

17. The ink set of claim 16, wherein L is 4; m is 1; n is 1; and $R_1$ and $R_2$ are both H.

18. The ink set of claim 16, wherein the fluorocarbon surfactant is present in the magenta ink.

19. The ink set of claim 16, wherein the concentration of the fluorocarbon surfactant in the ink ranges from about 0.1 wt % to about 1 wt %, based on the total weight of the ink.

20. A ink set as in to claim 13, wherein the magenta dye and the phenylenediamine compound derivative are added to the ink, respectively, in an amount ranging from about 2 wt % to about 8 wt % and from about 3 wt % to about 12.0 wt %, based on the total weight of the ink.

21. A magenta ink jet ink, comprising:
(a) a magenta dye having the structure:

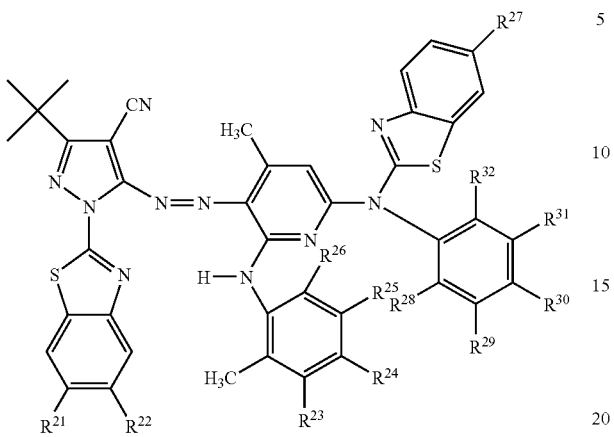

wherein
R²¹, R²³, R²⁵, R²⁷, R²⁹, and, R³¹ are independently a hydrogen atom or sulfonate group;
R²² is a hydrogen atom or nitro group;
R²⁶ and R²⁸ are independently a hydrogen atom or methyl group;
R²⁴ and R³⁰ are independently a methyl or sulfonate group; and
R³² is a methyl or methoxy group; and
(b) a second magenta dye which has a chroma (C) value of at least 60 when printed on plain paper at a 5 wt % dye load.

22. The magenta ink jet ink of claim 21, wherein the second magenta dye is an azo dye.

23. The magenta ink-jet ink of claim 21, wherein the second magenta dye is a triazine-containing azo dye.

24. The magenta ink-jet ink of claim 21, wherein the second magenta dye includes the structure, or salt thereof, from the group consisting of:

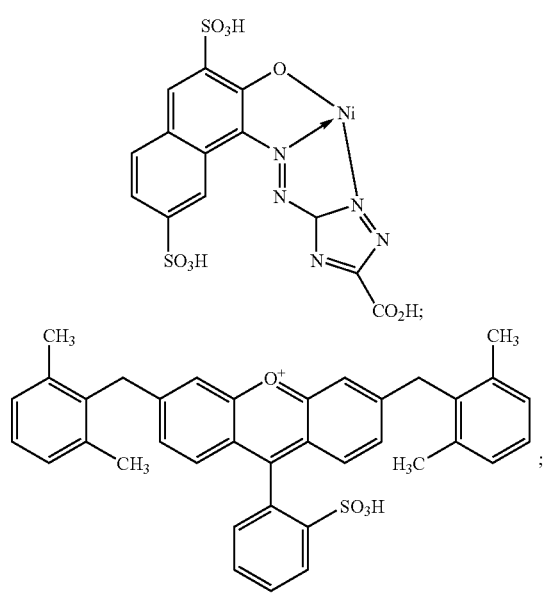

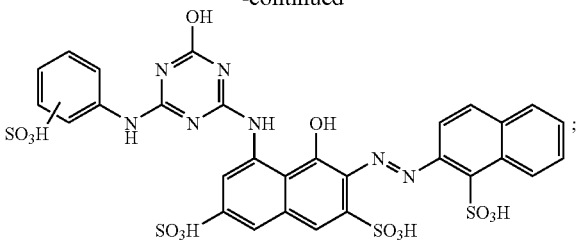

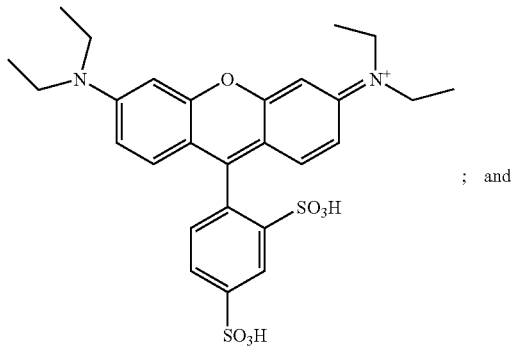

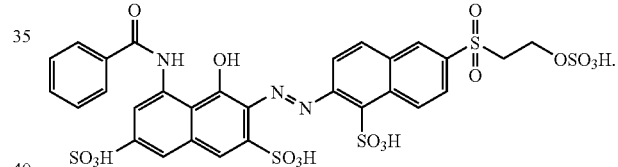

25. An ink set for ink jet printing, comprising:
(a) a cyan ink including a cyan dye having the structure:

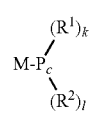

wherein
M is a hydrogen atom; a metal atom; or an oxide, hydroxide, or halide of the metal atom;
$P_c$ is a phthalocyanine nucleus;
$R^1$ and $R^2$ are independently a substituent selected from the group consisting of —$SOX^1$, —$SO_2X^1$, $SO_2NX^2X^3$, —$SO_3X^4$; where $X^1, X^2, X^3$, and $X^4$ are independently a hydrogen atom, a substituted or unsubstituted $C_1$ to $C_7$ alkyl group, a substituted or unsubstituted aryl group, or a substituted or unsubstituted heterocyclic group; wherein at least one of $R^1$ or $R^2$ has an ionic hydrophilic group as a substituent; and
k and l are independently an integer ranging from 1 to 3, where the sum of k and l is 4;

(b) a magenta ink including a magenta dye having the structure:

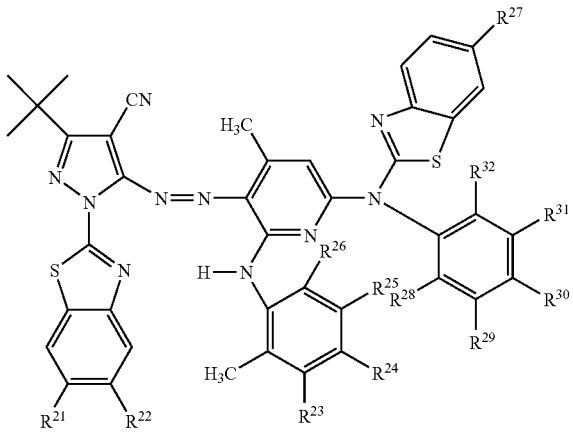

wherein $R^{21}$, $R^{23}$, $R^{25}$, $R^{27}$, $R^{29}$, and $R^{31}$ are independently a hydrogen atom or sulfonate group;

$R^{22}$ is a hydrogen atom or nitro group;

$R^{26}$ and $R^{28}$ are independently a hydrogen atom or methyl group;

$R^{24}$ and $R^{30}$ are independently a methyl or sulfonate group; and $R^{32}$ is a methyl or methoxy group, and (c) a yellow ink; and
(d) a black ink including a black pigment, wherein at least one of the cyan, magenta, or yellow inks includes at least one salt which causes the black pigment to precipitate upon contact when printed on media; wherein the salt further comprises calcium cations, magnesium cations, or a combination of calcium and magnesium cations at from about 1,000 ppm to 20,000 ppm.

26. The ink set of claim 25, wherein, with respect to the magenta dye:

$R^{21}$, $R^{23}$, $R^{27}$, and $R^{31}$ are sulfonate groups;

$R^{22}$, $R^{25}$, and $R^{29}$ are hydrogen atoms; and $R^{24}$, $R^{26}$, $R^{28}$, $^{30}$ and $R^{32}$ are methyl groups.

27. The ink set of claim 25, wherein, with respect to the cyan dye:

$R^1$ is —SO—$(CH_2)_3$—$SO_3Z$, or —$SO_2$—$(CH_2)_3$—$SO_3Z$;
$R^2$ is —$SO_2$—$(CH_2)_3$—$SO_2NH$—$C_2H_4OC_2H_4OH$, or —$SO_2$—$(CH_2)_3$—$SO_2NH$—$CH_2CH(OH)CH_3$, k is from 2 to 3; and Z is lithium, sodium, potassium, ammonium, tetramethylammonium, or a mixture thereof.

28. The ink set of claim 27, wherein with respect to the cyan dye:

$R^1$ is —$SO_2$—$(CH_2)_3$—$SO_3Z$;
$R^2$ is —$SO_2$—$(CH_2)_3$—$SO_2NH$—$CH_2CH(OH)CH_3$;
k is 3; and
Z is lithium.

29. The ink set of claim 25, wherein the yellow ink includes a yellow dye having the structure:

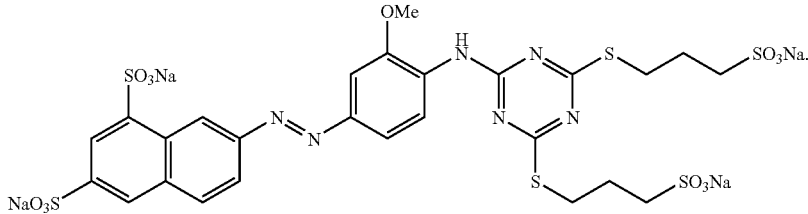

30. The ink set of claim 25, wherein the black pigment is a self-dispersed black pigment.

31. The ink set of claim 25, wherein the cyan ink further comprises AB9 or AB7.

32. The ink set of claim 25, wherein at least one ink in the set further comprises a phenylenediamine compound derivative having the structure:

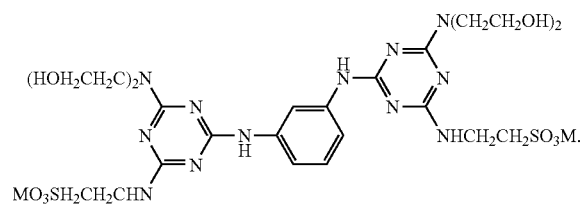

wherein M is a monovalent ion.

33. The ink set of claim 32, wherein the phenylenediamine compound derivative is present in the cyan ink.

34. The ink set of claim 32, wherein the phenylenediamine compound derivative concentration in the ink ranges from about 0.5 wt % to about 14 wt % based on the total weight of the ink.

35. The ink set of claim 32, wherein the magenta dye and the phenylenediamine compound derivative are added to the ink, respectively, in an amount ranging from about 2 wt % to about 8 wt % and from about 3 wt % to about 12.0 wt %, based on the total weight of the ink.

36. The ink set of claim 25, wherein at least one ink in the set further comprises a fluorocarbon surfactant formed at least in part from a polymer with the structure:

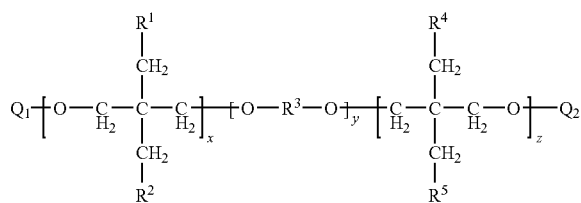

wherein
- $Q_1$ and $Q_2$ are independently selected from the group consisting of H, $SO_3^-W^+$, $COO^-W^+$, and COOH, where W is selected from the group consisting of $NH_4$, Li, Na, and K;
- $R_1$ and $R_2$ are independently selected from the group consisting of H and OH;
- $R_4$ and $R_5$ are independently selected from the group consisting of $O(CH_2)_m-(CF_2)_n-CF_3$, wherein m is from 1 to 3 and n is from 0 to 3;
- $R_3$ is selected from the group consisting of $(CH_2)_L$ and

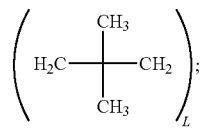

L is from 1 to 4;
x is from 1 to 10;
y is from 1 to 30; and
z is from 1 to 10.

37. The ink set of claim 36, wherein L is 4; m is 1; n is 1; and $R_1$ and $R_2$ are both H.

38. The ink set of claim 36, wherein the concentration of the fluorocarbon surfactant in the ink ranges from about 0.1 wt % to about 1 wt %, based on the total weight of the ink.

39. The ink set of claim 25, wherein the ink further includes a salt selected from the group consisting of calcium nitrate, calcium chloride, calcium acetate, magnesium nitrate, magnesium chloride, magnesium acetate, and combinations thereof.

40. The ink set of claim 25, wherein the salt comprises $Mg(NO_3)_2$ or a hydrate thereof.

41. The ink set of claim 25, wherein the salt is present in at least two of the cyan, magenta, and yellow inks.

42. The ink set of claim 25, wherein the self-dispersed pigment is surface treated or chemically modified with functional groups.

* * * * *

UNITED STATES PATENT AND TRADEMARK OFFICE
CERTIFICATE OF CORRECTION

PATENT NO. : 8,475,578 B2
APPLICATION NO. : 12/739401
DATED : July 2, 2013
INVENTOR(S) : Tye J. Dodge et al.

It is certified that error appears in the above-identified patent and that said Letters Patent is hereby corrected as shown below:

In the Claims:

In column 14, line 2, in Claim 1, delete "ink jet" and insert -- ink-jet --, therefor.

In column 14, line 25, in Claim 1, delete "$R^{27}R^{29}$," and insert -- $R^{27}$, $R^{29}$, --, therefor.

In column 14, line 58, in Claim 2, delete "ink jet" and insert -- ink-jet --, therefor.

In column 14, line 64, in Claim 3, delete "$Mg(NO_3)_2$," and insert -- $Mg(NO_3)_2$ --, therefor.

In column 14, line 65, in Claim 4, delete "ink jet" and insert -- ink-jet --, therefor.

In column 15, line 37, in Claim 5, delete "ink jet" and insert -- ink-jet --, therefor.

In column 15, line 40, in Claim 6, delete "ink jet" and insert -- ink-jet --, therefor.

In column 15, line 43, in Claim 7, delete "ink jet" and insert -- ink-jet --, therefor.

In column 15, line 66, in Claim 7, after "and" delete "1" and insert -- l --, therefor.

In column 15, line 67, in Claim 7, after "and" delete "1" and insert -- l --, therefor.

In column 16, line 24, in Claim 7, delete "$R^{27}$ ,$R^{29}$," and insert -- $R^{27}$, $R^{29}$, --, therefor.

In column 17, line 28, in Claim 13, before "7," insert -- claim --.

In column 17, line 51, in Claim 15, delete "14 wt %" and insert -- 14 wt %, --, therefor.

In column 18, line 44, in Claim 16, delete "30;and" and insert -- 30; and --, therefor.

Signed and Sealed this
Sixth Day of May, 2014

Michelle K. Lee
*Deputy Director of the United States Patent and Trademark Office*

CERTIFICATE OF CORRECTION (continued)
U.S. Pat. No. 8,475,578 B2

In column 18, line 47, in Claim 17, delete "4;m is 1 ;n is 1 ;and" and insert -- 4; m is 1; n is 1; and --, therefor.

In column 19, line 1, in Claim 21, delete "ink jet" and insert -- ink-jet --, therefor.

In column 19, line 24, in Claim 21, delete "and," and insert -- and --, therefor.

In column 19, line 36, in Claim 22, delete "ink jet" and insert -- ink-jet --, therefor.

In column 20, line 43, in Claim 25, delete "ink jet" and insert -- ink-jet --, therefor.

In column 20, line 66, in Claim 25, after "and" delete "1" and insert -- l --, therefor.

In column 20, line 67, in Claim 25, after "and" delete "1" and insert -- l --, therefor.

In column 21, line 67, in Claim 26, delete "$^{30}$" and insert -- $R^{30}$, --, therefor.

In column 22, line 9, in Claim 27, delete "3;and" and insert -- 3; and --, therefor.

In column 22, line 18, in Claim 28, delete "$R^{1}$" and insert -- $R^{1}$ --, therefor.

In column 22, line 20, in Claim 28, delete "3;and" and insert -- 3; and --, therefor.

In column 24, line 3, in Claim 36, delete "30;and" and insert -- 30; and --, therefor.